United States Patent [19]

Lindsay

[11] Patent Number: 5,287,686
[45] Date of Patent: Feb. 22, 1994

[54] ANTI-SCALPING BLADE FOR ROTARY LAWN MOWER

[76] Inventor: David P. Lindsay, 1225 Mariposa Dr., Santa Paula, Calif. 93060

[21] Appl. No.: 929,403

[22] Filed: Aug. 14, 1992

[51] Int. Cl.⁵ .......................................... A01D 34/82
[52] U.S. Cl. ...................................... 56/255; 56/295; 30/347
[58] Field of Search ........ 56/255, 295, 17.5, DIG. 17, 56/DIG. 20; 30/347, 357, 346.57

[56] References Cited

U.S. PATENT DOCUMENTS

| | | | |
|---|---|---|---|
| 4,302,878 | 12/1981 | Bonforte | 30/347 |
| 5,033,259 | 7/1991 | Adcock | 56/DIG. 17 X |
| 5,035,108 | 7/1991 | Meyer et al. | 56/17.5 X |

FOREIGN PATENT DOCUMENTS 2023390  1/1980  United Kingdom .................. 56/295

Primary Examiner—Terry Lee Melius
Attorney, Agent, or Firm—Gene W. Arant

[57] ABSTRACT

An improved blade member is shown for the type of rotary lawn mower that includes a shroud supported on wheels for horizontally traversing the surface of a lawn, a rotatably driven shaft extending downwardly at the horizontal center of the shroud for rotatably driving a blade assembly, and an opening in the upper part of the shroud for the exit of cuttings from the lawn. The blade member has a central section of circular configuration whose periphery is concentric to a center balance point, means for securing the driving shaft to the member at the center balance point, and three blade arms which are symmetrically circumferentially spaced about the central section and extend radially outwardly therefrom. Each blade arm has its forward side sharpened to form a cutting edge and has a portion of its width adjacent its rearward side inclined upwardly to create an air lift for lifting cuttings toward the exit port. Each of the cutting edges extends substantially the full length of the respective blade arm up to and adjacent the circular central section so that there is little or no dull edge of the blade arm adjacent the central section, and any tendency of the blade member to knock down grass without cutting it is therefore minimized.

8 Claims, 2 Drawing Sheets

ANTI-SCALPING BLADE FOR ROTARY LAWN MOWER

BACKGROUND OF THE INVENTION

The present invention relates to a rotary lawn mower of the type which includes a shroud supported on wheels for traversing the surface of a lawn, a blade assembly which is horizontally rotatable within the shroud, a shaft extending vertically downward at the center of the shroud and attached to the blade assembly for driving it in horizontal rotation, and an opening in the shroud for the exit of cuttings from the lawn.

The cutting of grass, if a science at all, is purely an experimental one. Some kind of sharp instrument must be applied to a stalk of grass if it is to be cut. In early times the scythe—a swinging blade—was used to cut grass or other vegetation. About 1830 Budding invented what is now known as the reel type mower. It uses a fixed blade moving horizontally against the grass, and rotating cutters arranged in a cage-like configuration which mesh with the upper surface of the fixed blade once each revolution. In that type of machine the stalks of grass are grasped between a moving cutter and the stationary blade.

A more recent development is the rotary mower with a horizontally rotating blade assembly. The blade assembly is motor driven, rotates at high speed, and relies on the stiffness of the stalk of grass to complete the desired cutting action. In U.S. Pat. No. 1,656,105 issued in 1928 Durkee disclosed the use of air lifts on the rotating blade arms of a rotary mower. The patent explains that such air lifts "caused the growth to be straightened up, and in fact drawn into the paths of rapidly moving cutting edges". As is now well known, the air lifts when used in conjunction with a shroud enclosing the blade assembly also create a vacuum that aids in lifting the cuttings and expelling them through an exit port provided for that purpose.

A type of rotary blade member now in widespread usage includes a single piece of metal which is of essentially constant width throughout its length, has a central hole for attaching the drive shaft of the motor, and each of its ends provides a cutting arm which has one side sharpened while its other side is inclined upwardly to provide an air lift. A central portion of the blade member is dull on both of its sides. The rotating cutting edges are potentially dangerous to human beings, and when concealed by the shroud their operation cannot be fully observed. In a scientific sense, therefore, the precise mechanism of the cutting action is not fully understood. There are, however, well-known problems or deficiencies in the operation of these machines. The blade member may experience a heavy frictional drag which then results in stalling the motor. Cuttings may be left on the ground behind the machine, presumably because the air lifts have created an inadequate vacuum. And a further problem is the "scalping" of the grass.

Scalping occurs when stalks of grass are knocked over and damaged, but are not cut. It may then become necessary to run the mower over the same piece of ground a second time to complete the job, and even then some uncut grass may remain. Also, the scalped grass generally creates an increased frictional drag on the machine, slowing its operation.

More specifically, when a particular cutting arm of the rotating blade member is at the forward edge of the machine near the front wheels, it is the cutting edge of that cutting arm that directly engages the grass. But the action of the blade may result in "scalping" some stocks of the grass. The cutting edge then moves over the particular stalks, damaging them and bending them over, but not cutting them. Any stalks of the grass which are not cut by the rotation of a cutting arm at the forward edge of the machine may later be engaged near the rearward portion of the machine. Presumably the previously uncut stalks are now bent toward the cutting arm whose cutting edge will be able to engage them from their under sides. However, in actual practice the previously scalped stalks may not rise far enough above the level of the blade to be cut, and hence will become even more badly bent and remain uncut.

GENESIS OF THE INVENTION

Many different conditions are encountered in the actual use of rotary mowers for cutting grass. Grass stands differ as to their moisture content or lack thereof, the height of grass to be cut, the thickness of the growth, the inherent toughness of the stalks, and so on.

I have arrived at the present invention after thousands of hours of first-hand observation of the action of rotary mowers. I have encountered the problems of excessive frictional drag and occasional stalling of the motor; of slow cutting speed; of cuttings sometimes being left behind and not picked up by the vacuum action; and of scalped grass. The quantity of the scalped grass is a measure of the inefficiency of the cutting operation.

I have observed that the outer ends of the rotary blade tend to wear very rapidly. This is particularly true because rocks or other hard objects are initially encountered by the very ends of the blade. The ends become pitted and scarred and lose their cutting ability.

I have come to the realization that conventional rotary mower blades have a central section which is inevitably a "trap" for the grass—that is, there is a dull edge which is permitted to engage some of the grass and knock it down without cutting it. The problem is aggravated by the fact that this dull edge is near the center of the blade and hence travels at a slow speed. If a particular stalk of grass is located where the lateral center of the shroud passes over it, but still remains uncut, it will have survived five separate onslaughts: first, a left-to-right cutting action of the cutting edges of both cutting arms; second, a left-to-right hitting action of the unsharpened edges of both cutting arms; third, a twisting engagement with the under surface of the exact center of the blade member; fourth, a right-to-left hitting action of the unsharpened edges of the cutting arms; and fifth, a right-to-left cutting action of the cutting edges. But on the other hand, if a surviving stalk of grass is located at one of the lateral edges of the shroud, then it will have survived movement of the cutting edges in only one direction.

I have also come to the conclusion that conventional rotary mower blades provide insufficient balance between the air lifts which are available to create a vacuum suction and the spaces between blade arms through which that vacuum suction must be applied. More specifically, I have come to the conclusion that the capacity of the air lifts must be greater and the total cross-sectional area of the spaces between blade arms must be smaller, so that the ratio of air lifts to air spaces will be much greater.

Thus, I have been confronted with two problems—how to minimize scalping, and how to increase vacuum. The present invention provides a solution to both of these problems.

PRIOR ART

Pertinent prior art includes the Durkee patent discussed above; Phelps patent No. 3,247,656 issued in 1966; and Bonforte patent No. 4,302,878 issued in 1981.

SUMMARY OF THE INVENTION

The present invention provides an improved blade member for use in a rotary lawn mower of the type which includes a shroud supported on wheels for horizontally traversing the surface of a lawn, a rotatably driven shaft extending vertically downward at the horizontal center of the shroud for rotatably driving the blade member, and an opening in the shroud for the exit of cuttings from the lawn.

More specifically, according to the invention an improved blade assembly comprises a metallic member of generally flat configuration having a central section with a center balance point for securement of a driving shaft, at least three blade arms which are symmetrically circumferentially spaced about the central section of the member and extend radially outwardly, each blade arm having its forward side sharpened to form a cutting edge, and each blade arm having a portion of its width adjacent its rearward side inclined upwardly to create an air lift for lifting cuttings toward the exit port. The under surface of the central section is circular and concentric to the balance point. The cutting edge of each blade arm extends substantially the full length of the respective blade arm up to and adjacent the circular under surface of the central section. The circular under surface is relatively smooth, and may be flush with the under surface of the adjacent portions of the blade arms, but is preferably slightly depressed relative to the blade arms. Any tendency of the blade assembly to knock the grass down without cutting it is therefore minimized.

According to the invention the use of at least three blade arms results in higher vacuum pulling force.

DRAWING SUMMARY

DETAILED DESCRIPTION OF THE INVENTION (FIGS. 1-4)

Figure 1:
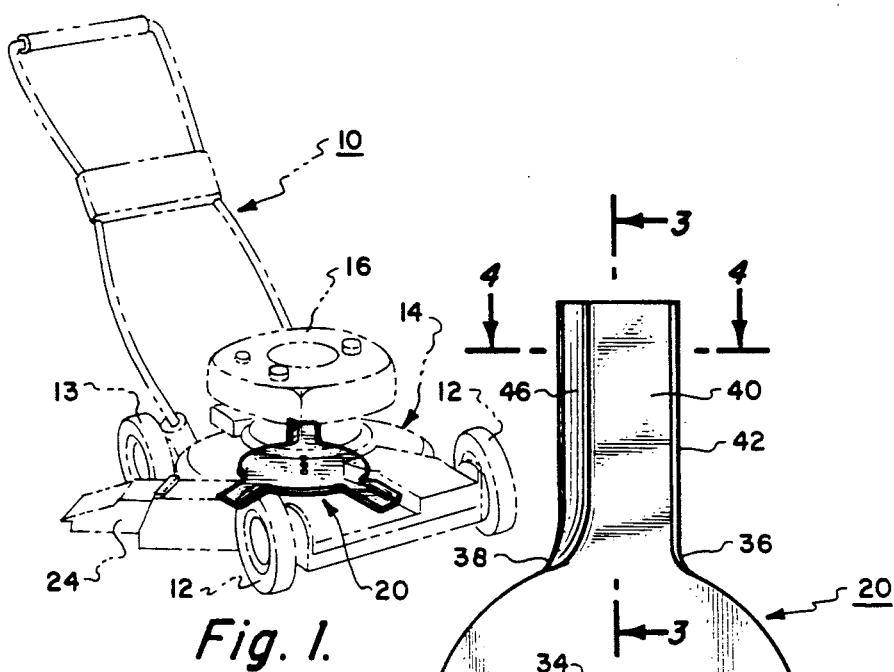
FIG. 1 is a perspective view of a conventional rotary mower utilizing a blade member in accordance with my invention.

FIG. 1 shows a rotary mower 10 with blade member 20 in accordance with the invention. The mower 10 is supported on front wheels 12 and rear wheels 13, and has a shroud 14 within which the blade member 20 is enclosed. A motor 16 located on top of the shroud 14 has a drive shaft, not specifically shown, which extends downwardly into the shroud and is attached to the center of blade member 20. An exit port 24 coupled to an opening in the upper portion of the shroud 14 is provided for cuttings to be expelled from the shroud.

Figure 2:
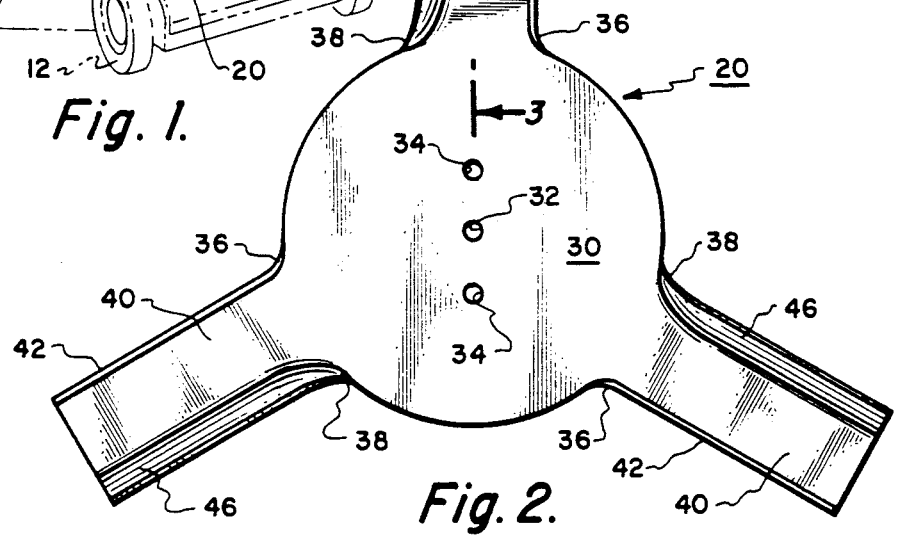
FIG. 2 is a top plan view of a first embodiment of my novel anti-scalping blade.
Figure 3:
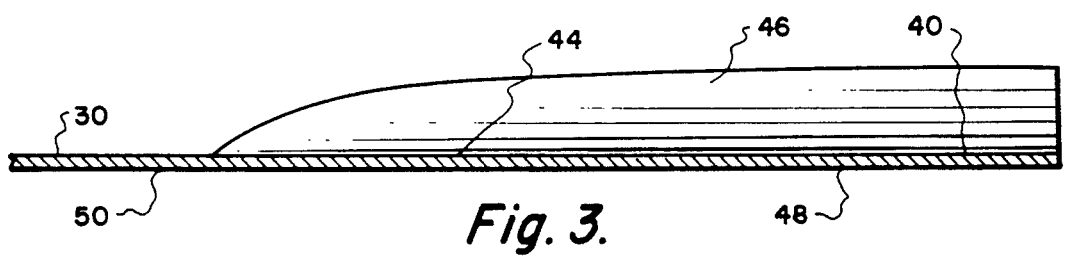
FIG. 3 is a cross-sectional view of one cutting arm and a portion of the central section of the blade of FIG. 2 taken on line 3—3 of FIG. 2.
Figure 4:
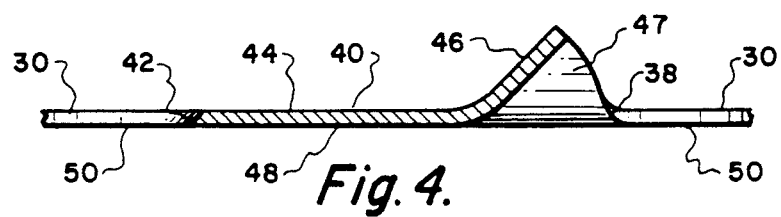
FIG. 4 is a cross-sectional view of the outer end portion of one of the cutting arms of the blade of FIG. 2 taken on line 4—4 of FIG. 2.

As shown in FIGS. 2-4, a first embodiment of my new blade member 20 is a single piece of metal of generally flat configuration, and is flat throughout its entire extent, except for the air lifts which will be described subsequently. The blade member has a circular central section 30 and three identical radially extending cutting arms 40. The diameter of central section 40 is preferably about eight and three-quarters inch (8¾"). Each blade arm 40 is preferably six inches (6") in length and has a width of two and one-half inches (2.5") throughout its length. Thus the envelope or periphery of the blade arms preferably has a diameter of twenty and three-quarters inches (20¾"), and the blade member 20 therefore fits within a standard rotary mower whose shroud has an internal diameter of twenty-one inches (21").

I much prefer that the diameter of the central section 30 be, as described above, more than one-third of the diameter of the outer envelope or periphery of the blade arms. With the dimensions as set forth above the combined cross-sectional areas of the spaces between blade arms, through which a vacuum must be pulled, is less than twice the total cross-sectional area of the blade member itself. In other words, the total cross-sectional area of the blade member is more than one-third the area of the outline of the periphery of the blade arms. It is important, particularly for tougher or thicker stands of grass, to maintain about this ratio, or even to further increase the area of the blade member relative to the spaces, in order to provide a strong enough vacuum pull in the spaces between cutting arms.

The three blade arms 40 are spaced circumferentially and symmetrically about the central section 30 and extend radially outwardly therefrom. Thus the three blade arms 40 are separated by angles of 120 degrees between their longitudinal center lines. The central section 30 of blade member 20 has a central hole 32 therein which is located precisely at the static balance point of the blade member. There are also two other holes 34 which are located on a common axis passing through the center hole 32. The center hole 32 and holes 34 together permit attaching the blade member 20 to the drive shaft of any one of a number of standard mowers.

Each of the blade arms 40 has its forward side sharpened to form a cutting edge 42 and a portion of its width adjacent its rearward side inclined upwardly to create an air lift 46 for lifting cuttings toward the exit port 24. The central section 30 is of circular configuration concentric to the balance point. Each cutting edge 42 formed on the forward side of a blade arm extends throughout substantially its full length. That is, each cutting edge 42 extends from the extreme outer end of the blade arm substantially all the way to the periphery of circular central section 30.

The juncture of cutting edge 42 with the periphery of circular center section 30 is slightly rounded at 36, for ease of manufacture and to minimize metal fatigue. The juncture of lift edge 46 with the periphery of center section 30 is similarly rounded at 38.

FIG. 4 is a cross-sectional view of the blade arm 40 showing its shape, which is substantially uniform throughout its length. In the lateral center portion of the blade arm 40 both its upper surface 44 and its lower surface 48 are flat and are parallel to each other. Fairly near to its lateral center the metal is bent upward to form the air lift section 46, and rises about an inch above the flat part of the blade arm. As best seen in FIGS. 2 and 4, the air lift section 46 tapers at 47 at the inner end of the cutting arm so as to join the common plane of central section 30.

Cutting edge 42 is formed by tapering the upper surface 44 down to meet the bottom surface 48. Thus, bottom surface 48 remains essentially flat throughout its full lateral width to the extremity of the cutting edge 42.

Circular center section 30 is made substantially smooth on its under surface 50, in order to minimize friction with the grass. Its outer periphery between adjacent blade arms 40 conforms to the perimeter of a circle, thus avoiding a "trap" for the grass. The under surface of central section 30, in the embodiment of FIG. 2, is made flush with the under surfaces of contiguous portions of the blade arms, as shown in both of FIGS. 3 and 4.

The reduction of scalping action by my new blade member is due primarily to the circular configuration of the central section 30 and its concentric relation to the center hole 32. Perhaps equally important is the fact that cutting edges 42 extend substantially all the way to the periphery of the central section. Thus there is very little if any dull edge on the blade arm which can be available to strike a stalk of grass and knock it down without cutting it.

A comparative test was made with the blade member as shown in FIGS. 2, 3, and 4. It was found that this blade member, used in an old and partially worn-out four horsepower mower, outperformed a conventional blade member used in a new five horsepower mower. That is, it accomplished more cutting of the same type of grass in the same time period with less scalping.

DETAILED DESCRIPTION OF PREFERRED EMBODIMENT
(FIGS. 5-7)

Figure 5:
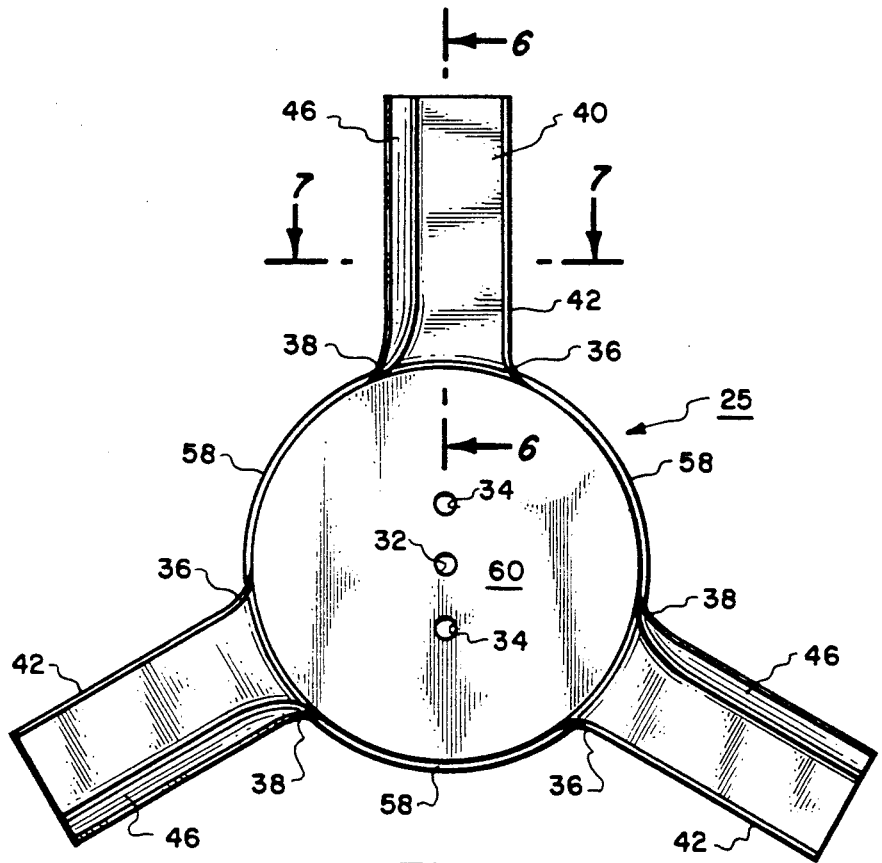
FIG. 5 is a top plan view of the presently preferred embodiment of my novel anti-scalping blade.
Figure 6:
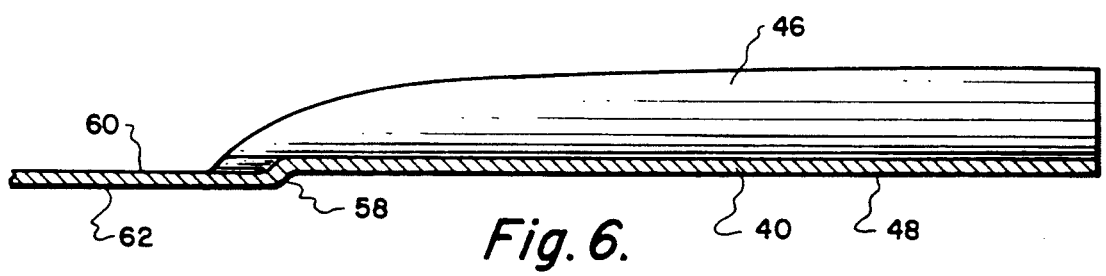
FIG. 6 is a cross-sectional view of one cutting arm and a portion of the central section of the blade of FIG. 5 taken on line 6—6 of FIG. 5.
Figure 7:
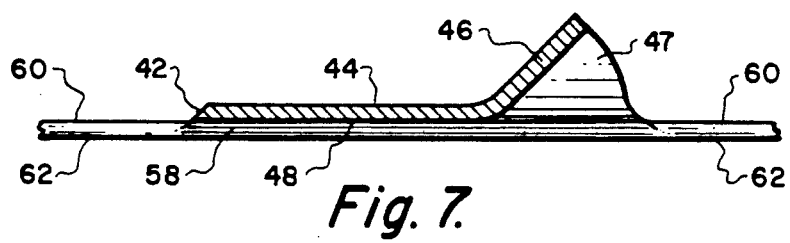
FIG. 7 is a cross-sectional view of the outer end portion of one of the cutting arms of the blade of FIG. 5 taken on line 7—7 of FIG. 5.

In blade member 25 of the preferred embodiment of FIGS. 5-7 the cutting arms 40 are constructed and arranged the same as in the first embodiment. The preferred embodiment differs in only one significant respect from the first embodiment. That is, the circular central section, now designated 60, is slightly depressed relative to the flat under surfaces 48 of the cutting arms 40. As best seen in FIG. 6, the outer periphery of the circular central section 60 is provided with a small upwardly turned lip 58 before it joins the inner end of each of the cutting arms. The lip 58 also extends around the periphery of the central section 60 between the cutting arms. Thus the periphery of the central section 60 between blade arms is tapered on its under surface 62 underneath the flange or lip 58, so as to minimize friction with grass passing underneath said central section.

By raising the blade arms and slightly offsetting them in an upward direction relative to the circular central section, and tapering the under surface of the central section between blade arms as shown, the total friction with the grass is decreased.

ALTERNATE FORMS

My blade member 20 of the first embodiment may if desired be modified by adding a flange or lip similar to the lip 58 to the periphery of the central section 30 between cutting arms, so as to minimize friction with grass passing underneath said central section.

It is possible to incorporate my anti-scalping design into a blade member having four or more blade arms. The central section is still made circular, and the cutting edges are still brought as near as possible to the central section. I believe that there are advantages in using three blade arms, however, because the blade member maintains a better balance under conditions of wear.

The presently preferred embodiment of the invention has been disclosed in complete detail in order to comply with the requirements of the patent laws. However, the scope of the invention is to be measured only in accordance with the appended claims.

What is claim is:

1. In a lawn mower of the type which includes a shroud supported on wheels for horizontally traversing the surface of a lawn, a rotatably driven shaft near the horizontal center of the shroud and extending downwardly for rotatably driving a blade attached thereto, and an opening in the upper portion of the shroud for the exit of cuttings from the lawn, an anti-scalping blade comprising: formed metallic member of generally
    (a) an integrally flat configuration having a central section with a center balance point, said member being disposed horizontally within the shroud;
    (b) means for securing the driving shaft to said member in concentric relation to said center balance point;
    (c) said member also having three blade arms which are symmetrically circumferentially spaced about said central section and extend radially outwardly therefrom, each of said blade arms having a forward side sharpened to form a cutting edge and having a portion of its width adjacent its rearward side inclined upwardly to create an air lift for lifting cuttings toward the exit port; and
    (d) said central section being of circular configuration concentric to said balance point, its diameter being at least one-third the diameter of the outer perimeter of said blade arms, both said air lifts and said cutting edges extending substantially the full length of the respective blade arms up to and adjacent said central section, and the under surface of said central section being relatively smooth, so that
        (1) any tendency of said blade member to knock down grass without cutting it is minimized;
        (2) the spaces between blade arms through which a vacuum force is created by the combined action of said air lifts have a combined cross-sectional area which is less than twice the cross-sectional area of said member; and
        (3) the minimum speed of each blade arm cutting edge adjacent said central circular section is more than onethird its maximum speed at its outer end.

2. The apparatus of claim 1 wherein the under surface of said central section is substantially flush with the undersurfaces of the contiguous portions of said blade arms.

3. The apparatus of claim 1 wherein the under surface of said central section is vertically offset relative to the undersurfaces of the contiguous portions of said blade arms.

4. The apparatus of claim 1 wherein the under surface of said central section is vertically depressed relative to the undersurfaces of the contiguous portions of said blade arms.

5. The apparatus of claim 1 wherein said blade arms are of substantially constant width throughout their length.

6. The apparatus of claim 1 wherein said circular central section has an upwardly turned flange between cutting arms, so as to minimize friction with grass passing underneath said central section.

7. The apparatus of claim 6 wherein the under surface of said central section is vertically depressed relative to the undersurfaces of the contiguous portions of said blade arms, and the periphery of said central section between blade arms is tapered upwardly on its under surface so as to minimize friction with grass passing underneath said central section.

8. The apparatus of claim 1 wherein the juncture of the cutting edge of each of said cutting arms with the periphery of said circular center section is slightly rounded, and the juncture of the lift edge of each of said cutting arms with the periphery of said circular center section is similarly rounded.

* * * * *